United States Patent Office 3,277,357
Patented Oct. 4, 1966

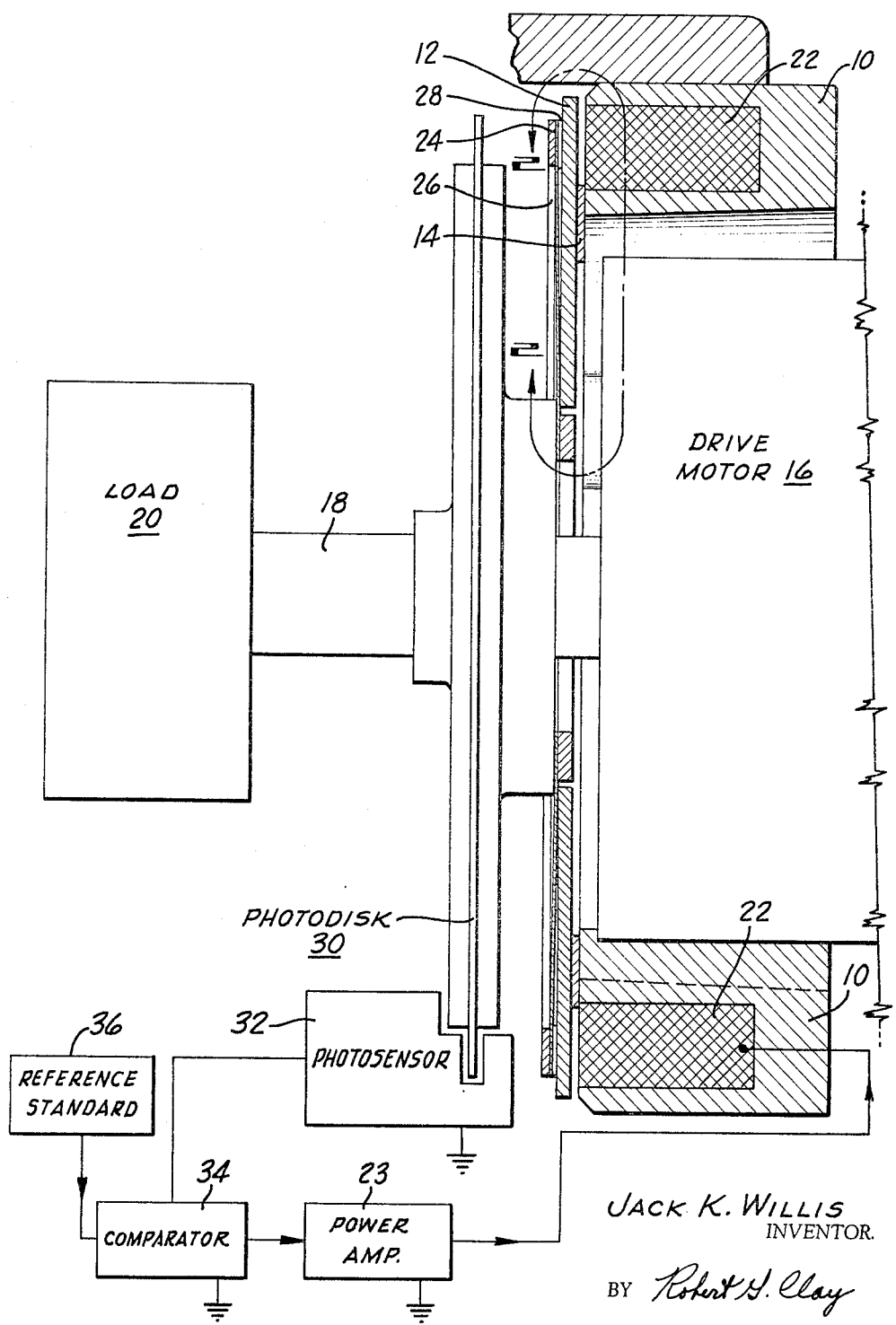

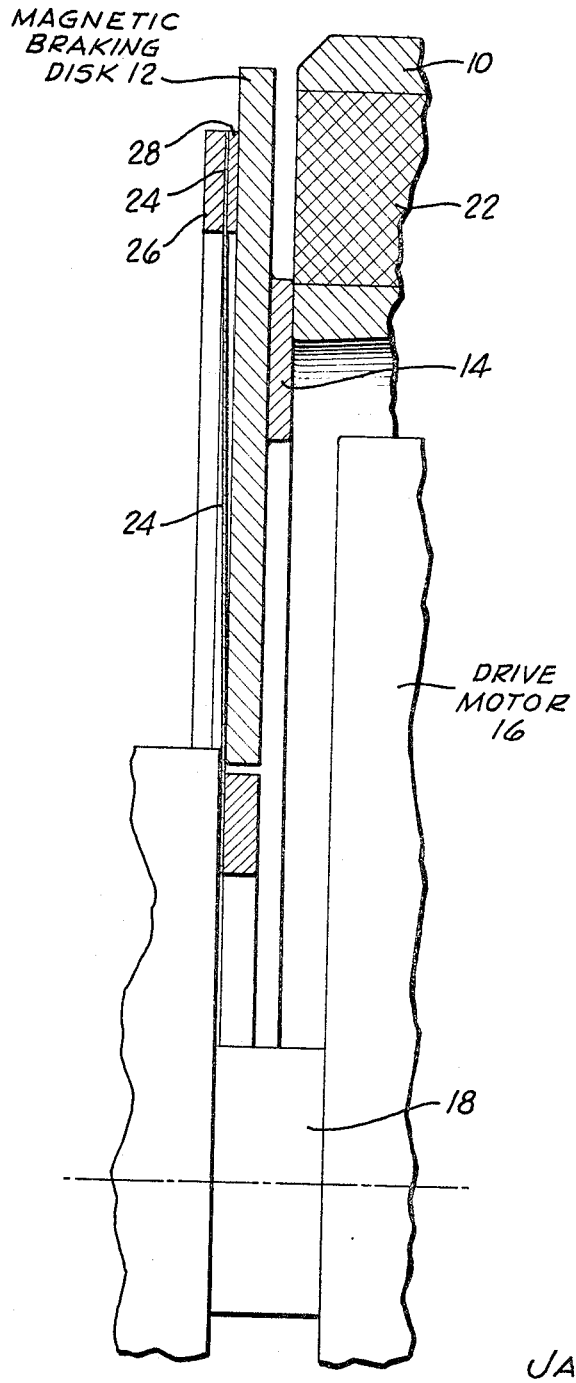
FIG_2

3,277,357
SPEED CONTROL FOR A ROTARY DEVICE BY MEANS OF BRAKING
Jack K. Willis, San Bruno, Calif., assignor to Ampex Corporation, Redwood City, Calif., a corporation of California
Filed June 4, 1963, Ser. No. 285,272
2 Claims. (Cl. 318—304)

This invention relates to a means for controlling the angular velocity of a rotary device, and in particular to a novel and improved servosystem wherein the angular velocity and position of a rotary driven shaft may be controlled.

Various systems and combinations have been proposed for providing speed control for rotating bodies. Generally, such systems employ feedback loops that utilize a control or an error voltage to vary the characteristics of a braking device by means of mechanical, electrical or magnetic elements, or a combination of these.

However, when it is desired to provide a servosystem for controlling a rotary device over a wide range of angular speeds, presently known systems encounter serious problems. For example, if a control or compensating error voltage is applied directly to the windings of a motor to vary the speed of the motor, the inertia of the motor mass represents a severe limitation precluding rapid response. Or, by way of example, if eddy current effects are employed whereby magnetic flux lines that permeate a rotating body induce a drag effect, then the velocity of rotation of the body wherein eddy currents are formed limits the torque capabilities of the body, especially at low speeds. It would be desirable to provide a servosystem that affords rapid response to speed correction signals, and one that is capable of operating over a wide range of speeds.

An object of this invention is to provide a novel and improved speed control for a rotary device.

Another object of this invention is to provide a speed control that is characterized by rapid response for operation over a wide range of speeds.

According to this invention, a servosystem for controlling the angular speed of a rotary drive element comprises a magnetic means and a frictional braking means. The braking means is mounted for rotation with the drive element, whereas the magnetic means is fixed in position and is frictionally coupled with the braking means. (Alternatively, the braking means may be fixed and the magnetic means may be rotatably mounted.) In operation, the frequency of rotation of the drive element is sensed and compared to a selected reference frequency to provide a control signal that is applied to the magnetic means. As a result, the magnetic force associated with the magnetic means attracts the braking means to such degree that the resultant braking force causes the drive element to rotate at the selected frequency.

In a particular embodiment of the invention, a magnetic cup-like annulus or ring, with a circular electrical coil disposed therein, is secured in a fixed position, and concentrically disposed relative to a rotary shaft driven by a motor, which may be of the hysteresis synchronous type. As the drive motor rotates, a photodisk having uniformly spaced index marks rotates conjointly with the motor driven shaft. By viewing the rotation of the index marks, a photosensing device measures the rotary frequency of the photodisk, and accordingly the rotational frequency of the shaft. The sensed rotational frequency is compared to a selected reference frequency by a comparator to produce a control or error voltage that is applied to the electromagnetic structure consisting of the electrical coil disposed within the cup-like portion of the magnetic ring. The magnetic field associated with the electromagnet is varied, thereby varying the degree of magnetic attraction that exists between the magnetic ring and a brake element or disk that is in continuous frictional engagement with a peripheral portion of the cup-like ring. The brake element, which is mounted for rotation with the shaft, decelerates the rotating shaft in accordance with the degree of frictional coupling established with the fixed magnetic ring. In this manner, a speed control with rapid response over a wide range of available speeds is made possible.

The invention will be described in greater detail with reference to the drawing in which:

FIGURE 1 is a schematic representation of the inventive system, partly in block form; and FIGURE 2 is an expanded cross-sectional view of an area encompassed by the elliptical path 2—2 in FIGURE 1.

Similar numerals designate similar parts throughout the drawing.

With reference to FIGURES 1 and 2, a speed control system for a rotary device comprises a magnetic cup-like annulus or ring 10 and a frictional braking device that includes a magnetic braking disk 12 and braking material 14, such as an asbestos gasket, interposed between the inner circular periphery of the magnetic ring 10 and the disk 12. The cup-like ring 10 is fixed in position and encompasses part of a drive motor 16 that serves to drive a rotary shaft 18. The rated speed of the motor 16 without a load exceeds any one of a multiplicity of speeds desired for driving a load 20. The load 20 is attached to one end of the shaft 18 and may be a tape driving capstan of a magnetic tape apparatus, by way of example.

Within the magnetic ring 10 there is a circular electrical coil 22, which forms, in combination, an electromagnet that receives a control current from a power amplifier 23 whereby a magnetic field is developed. The inner and outer peripheral circular rims of the cup-like ring 10 serve as magnetic poles between which magnetic lines of flux are established. The magnetic flux serves to attract the braking disk 12 towards the fixed ring 10, thereby urging the rotating disk 12 axially along the shaft 18. Variations in the control current received from the amplifier 23 cause corresponding variations in the magnetic field, thereby changing the degree of magnetic attraction between the ring 10 and the disk 12, and consequently determining the amount of axial displacement of the disk.

The rotary braking disk 12 is constantly urged towards the magnetic ring 10, by means of a prestressed diaphragm 24 made from spring steel, by way of example. Thus the disk 12 and the ring 10 are always frictionally coupled through the gasket 14. A support plate 26 is employed to secure the diaphragm 24, and a very thin shim 28 is inserted between the diaphragm 24 and the brake disk 12 provides the stressing force to the spring steel. The force exerted by the disk 12 against the frictional material 14 determines the amount of deceleration of the rotating shaft.

In order to establish the amount of axial force on the braking disk 12 necessary to provide a frictional force that achieves the desired rotary speed of the shaft 18, a rotational frequency sensing system is utilized. To this end, a photodisk 30, such as described in copending U.S. patent application SN 245,582, assigned to the same assignee, is mounted on the shaft 18 close to the braking disk 12. The photodisk 30 has uniformly spaced indexing marks registered around its outer periphery whereby a photosensing device 32, such as a source of light and photoelectric cell combination, may be used to sense the passage of the index marks as the disk 30 rotates with the driven shaft 18. The photosensor 32 develops a square wave pulse signal having a frequency indicative of the rotational frequency of the photodisk 30. This pulse signal is applied to a frequency comparator 34, which also receives a reference frequency signal from a signal generator or standard 36. The reference frequency is indicative of a selected frequency of operation at which it is desired to maintain the driven shaft 18 and the load 20. It is to be understood that the standard 36 is adjustable and affords a multiplicity of selectable frequency settings at which the load 20 may be driven. A phase lock may also be used for controlling the angular position of the rotary shaft 18.

In operation, the drive motor 16 tends to rotate at its rated speed. The photosensor 32 supplies a signal representing the actual rotary speed of the photodisk 30 and shaft 18 to the comparator 34. When the operator adjusts the frequency standard 36 for a desired operational speed, a D.C. error voltage is developed that is passed to the power amplifier 23, which develops a current that is applied to the coil 22, thereby increasing the intensity of the magnetic field associated with the electromagnet. As a result, the rotating braking disk 12 is urged axially towards the fixed magnetic ring 10, and in combination with the prestressed diaphragm 24 exerts a greater frictional force against the inner peripheral surface of the cup-like ring 10 through the frictional braking material 14. The braking disk 12 is thus decelerated and, in turn, retards the rotation of the shaft 18 to which it is firmly attached and with which it rotates in unison. When the selected speed is reached, the comparator 34 provides a zero control voltage and the system locks into and maintains the selected rotary speed. It is apparent that the frictional coupling between the braking disk 14 and the magnetic ring 10 provides a sensitive and accurate control of the speed of the rotating shaft 18 by means of the axial displacement of the disk 12, achieved in microinches, in response to a control voltage.

There has been described herein a servo control system that utilizes an electromagnetic device, which includes a cup-like magnetic annulus, and a frictional braking device that is urged into varying degrees of frictional coupling with the electromagnetic device to decelerate a rotary system until the system reaches a predetermined speed.

What is claimed is:
1. A braking device for a rotary shaft, comprising:
   an electro-magnet including a ring member fixed in position coaxial with and spaced from said shaft, said ring having an annular electrical coil inset in one side thereof coaxial with said shaft and facing in one axial direction of said shaft;
   a magnetic braking disk mounted for rotation with said shaft confronting said electro-magnet;
   an annular gasket of frictional material disposed between said magnetic disk and said electro-magnet;
   a spring disk mounted on said shaft on the side of said braking disk opposite said electro-magnet;
   an annular shim element disposed between the peripheries of said spring disk and braking disk so as to load said spring disk to urge said braking disk and friction gasket into perpetual frictional engagement with said electro-magnet; and
   means for variably energizing said electro-magnet to vary the force to frictional engagement of said braking disk, friction gasket and electro-magnet within a range of values all exceeding that provided by said spring disk.

2. A servosystem for controlling the rotary speed of a shaft comprising:
   a driver motor for providing rotary motion to the shaft;
   an electro-magnet including a ring member fixed in position coaxial with and spaced from said shaft; said ring having an annular electrical coil inset in one side thereof coaxial with said shaft and facing in one axial direction of said shaft;
   a magnetic braking disk mounted for rotation with said shaft and confronting said electro-magnet;
   an annular gasket of frictional material disposed between said magnetic disk and said electro-magnet;
   a spring disk mounted on said shaft on the side of said braking disk opposite said electro-magnet;
   an annular shim element disposed between the peripheries of said spring disk and braking disk so as to load said spring disk to urge said braking disk and friction gasket into perpetual frictional engagement with said electro-magnet;
   a photodisk having uniformly spaced index marks around its periphery mounted for rotation with the shaft;
   a photosensing device for viewing the index marks during rotation of said photodisk and for providing a frequency signal indicative of the rotational speed of the shaft;
   a reference standard for providing a selected reference frequency signal;
   a comparator means for comparing the selected reference frequency signal and the indicative frequency signal of the shaft, and for providing a control signal; and
   means for applying the control signal to said electro-magnet to vary the force of frictional engagement of said braking disk, friction gasket and electro-magnet within a range of values all exceeding that provided by said spring disk.

References Cited by the Examiner
UNITED STATES PATENTS

| | | | |
|---|---|---|---|
| 2,558,594 | 6/1951 | Trittle. | |
| 2,782,355 | 2/1957 | Wilcox | 318—302 |
| 3,100,554 | 8/7963 | Dobek | 318—372 |
| 3,148,751 | 8/1964 | White | 318—372 |
| 3,162,793 | 12/1964 | Mason | 318—372 |

ORIS L. RADER, *Primary Examiner.*

S. GORDON, J. C. BERENZWEIG, *Assistant Examiners.*